(12) United States Patent
Ho

(10) Patent No.: US 9,137,969 B2
(45) Date of Patent: Sep. 22, 2015

(54) WATER CONTAINER STRUCTURE

(71) Applicant: Ing Dah Enterprise Co., Ltd., Tainan (TW)

(72) Inventor: Wang-Jyun Ho, Tainan (TW)

(73) Assignee: Ing Dah Enterprise Co., Ltd., Tainan (TW)

( * ) Notice: Subject to any disclaimer, the term of this patent is extended or adjusted under 35 U.S.C. 154(b) by 88 days.

(21) Appl. No.: 14/164,492

(22) Filed: Jan. 27, 2014

(65) Prior Publication Data
US 2015/0208610 A1  Jul. 30, 2015

(51) Int. Cl.
*A01K 7/00* (2006.01)
*A01K 7/06* (2006.01)

(52) U.S. Cl.
CPC .......................................... *A01K 7/06* (2013.01)

(58) Field of Classification Search
CPC ........... A01K 7/00; A01K 7/025; A01K 7/06; A01K 5/01; A01K 5/0107; A01K 5/0114; A01K 5/02
USPC ............... 119/51.01, 52.1, 52.4, 53, 53.5, 54, 119/56.1, 74, 75, 78, 80
See application file for complete search history.

(56) References Cited

U.S. PATENT DOCUMENTS

| | | | | | |
|---|---|---|---|---|---|
| 2,726,636 | A | * | 12/1955 | Frederiksen | 119/72.5 |
| 2,874,678 | A | * | 2/1959 | Bradley | 119/61.2 |
| 4,691,665 | A | * | 9/1987 | Hefner | 119/77 |
| 4,840,143 | A | * | 6/1989 | Simon | 119/52.1 |
| 5,845,605 | A | * | 12/1998 | Malamphy | 119/69.5 |
| 6,810,830 | B1 | * | 11/2004 | Cheng | 119/72.5 |
| D504,982 | S | * | 5/2005 | Kim | D30/121 |
| 7,051,676 | B1 | * | 5/2006 | Deshaies | 119/75 |
| 7,117,818 | B2 | * | 10/2006 | Pappas et al. | 119/72.5 |
| 7,600,487 | B2 | * | 10/2009 | Stone et al. | 119/72 |
| 8,245,667 | B2 | * | 8/2012 | Mateer et al. | 119/77 |
| 8,464,660 | B2 | * | 6/2013 | Valeriano | 119/72 |
| 9,004,007 | B2 | * | 4/2015 | Faunce et al. | 119/78 |

* cited by examiner

*Primary Examiner* — Richard Price, Jr.
(74) *Attorney, Agent, or Firm* — Alan D. Kamrath; Kamrath IP Lawfirm, P.A.

(57) ABSTRACT

The present invention provides a water container structure, which is a container combination for an animal to drink water and comprises a containing unit, for water to be added, at an upper end and a receiving unit for the animal to drink the water with its mouth at a lower end. A plurality of grooves, spaced up and down, are concaved at two corresponding sides at a predetermined height of the containing unit at the upper end for two projecting portions extending inward at an upside of the receiving unit at the lower end to insert in. A water dispensing amount of the container combination is controlled by installing and screwing the water dispensing device of the containing unit and the upper end on the receiving unit at the lower end by hand to allow to predetermined control of the water dispensing amount.

3 Claims, 9 Drawing Sheets

WATER CONTAINER STRUCTURE

BACKGROUND OF THE INVENTION

1. Field of the Invention

The present invention provides a water container structure, which is a container combination for an animal to drink water and comprises a containing unit at an upper end and a receiving unit at a lower end. A plurality of grooves, spaced up and down, are concaved at two corresponding sides at a predetermined height of the containing unit at the upper end for two projecting portions extending inward at an upside of the receiving unit at the lower end to insert in. A water dispensing amount of the container combination is controlled by installing the containing unit at the upper end on the receiving unit at the lower end by hand to screw the water dispensing device of the containing unit at the upper end with the receiving unit at the lower end to allow for predetermined control of the water dispensing height and whether or not to dispense water.

2. Description of Related Art

The water dispenser, designed by the related industry in nowadays and used for feeding water to animals, usually comprises a tank, having a predetermined volume and profile, and a base plate. The implementation for the tank and the base plate to contain water is to turn the tank upside down to pour in clean water then to correspondingly screw the base plate in reverse with the lower part of the tank to combine into one. Then, disposing the water dispenser in a positive placement so that water in the tank is guided into the base plate through the water dispensing exit, set on a lower periphery of the tank, to supply clean water for the animals to drink.

Herein, the inventor of the present invention focuses on the adjustment of the water dispensing amount and whether or not to dispense water while feeding water to animals and designs a combination to facilitate the user to make appropriate adjustments depending on the requirement of feeding water/feed to the animals.

BRIEF SUMMARY OF THE INVENTION

The invention is a container, which is disposed with proper combination for controlling water for feeding an animal to drink. The combination of the water dispenser or the feed container comprises a containing unit, for water to be added, at an upper end and a receiving unit for the animal to drink the water with its mouth at a lower end. A plurality of grooves, spaced up and down, are concaved at two corresponding sides at a predetermined height of the containing unit at the upper end for two projecting portions extending inward at an upside of the receiving unit at the lower end to insert in. A water dispensing amount of the container combination is controlled by installing the containing unit at the upper end on the receiving unit at the lower end by hand to screw the water dispensing device of the containing unit at the upper end with the receiving unit at the lower end to allow for predetermined control of the water dispensing height and whether or not to dispense water.

The main objective of the present invention is the container combination for an animal to drink water and comprises a containing unit, for water to be added, at an upper end, a receiving unit for the animal to drink the water or eat the feed with its mouth at a lower end, and a cover covering an opening near an upside of the containing unit. The containing unit at the upper end combines with the receiving unit at the lower end. A plurality of grooves, spaced up and down, are concaved at two corresponding sides at a predetermined height of the containing unit at the upper end for two projecting portions extending inward at an upside of the receiving unit at the lower end to insert in. A water dispensing amount of the container combination and dispensing water or not are controlled by installing the containing unit at the upper end on the receiving unit at the lower end by hand to screw the water dispensing device of the containing unit at the upper end with the receiving unit at the lower end to allow for predetermined control of the water dispensing amount and whether or not to dispense water.

A second objective of the present invention is that a water dispensing exit of the containing unit at the upper end of the container combination for an animal to drink water comprises: a water dispensing device is screwed at an exit section at a downside of the containing unit. The water dispensing device has a guiding tube having a predetermined length. An end of the guiding tube is covered with a stopping section, which is tilted inward at a lower end for putting a water stopping bead inside and for forming a directional restriction at the stopping section. A screw section is formed on an inner upper section of the guiding tube for a ring to enclose around the exit section of the containing unit during assembling, and the guiding tube, put the water stopping bead therein, is screwed on the exit section of the containing unit. The water stopping bead in the water dispensing device is pushed up by a pushing portion of the receiving unit at the lower end in a water dispensing state. When the water dispensing amount reaches the level of the exit section, the sealing cover prevents air from getting inside of the containing unit so that the water dispensing device stops dispensing water. When the water stopping bead of the water dispensing device leaves the pushing portion of the receiving unit, the water stopping bead freely falls against the stopping section of the guiding tube to provide a water stopping state. The user can add water at this time.

The third objective of the present invention is the container combination for an animal to drink has an opening near an upside of the containing unit at the upper end to be directionally covered or directionally screwed with a sealing cover.

DETAILED DESCRIPTION OF THE INVENTION

Figure 1:
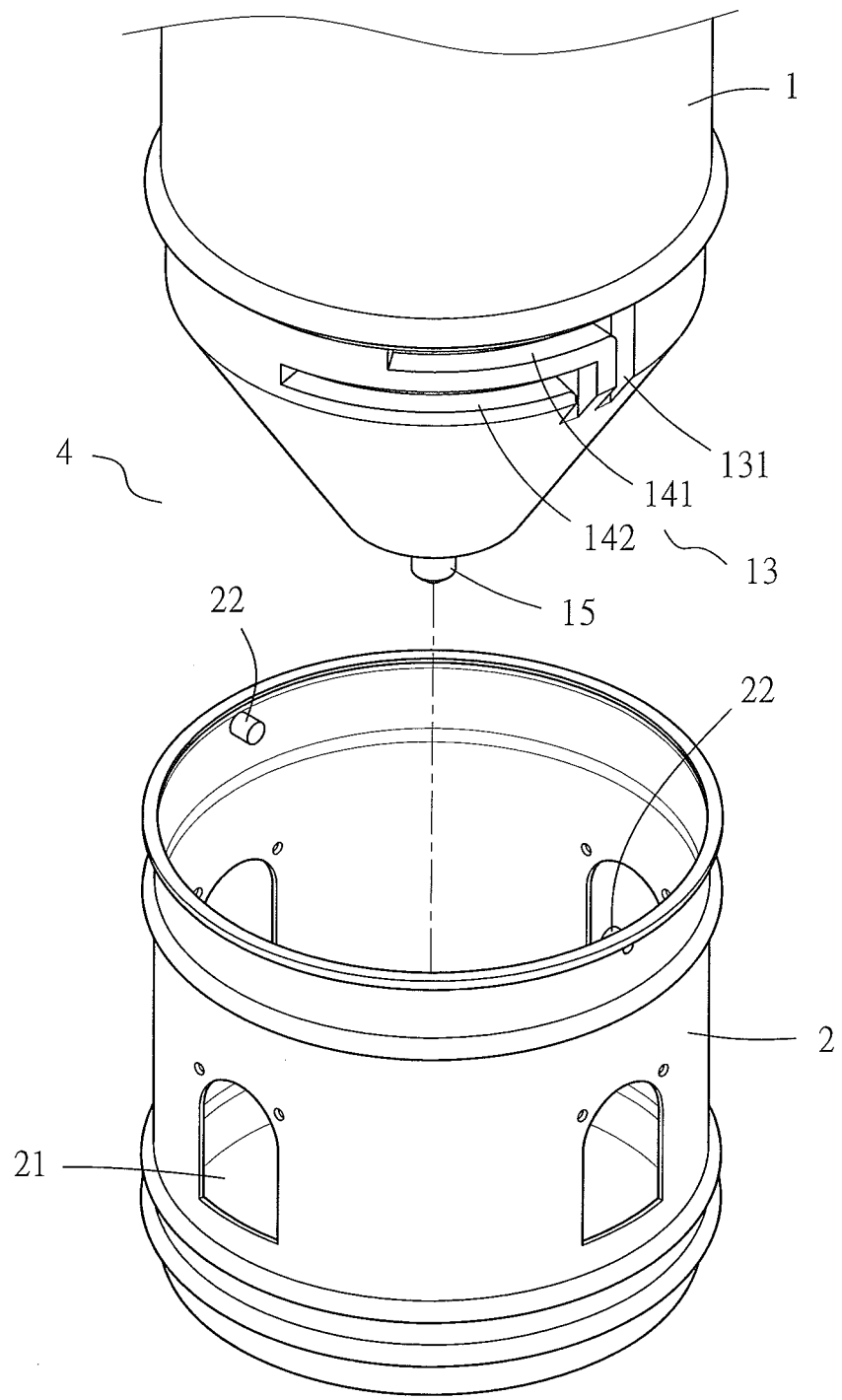
FIG. 1 is an exploded view of components of the water container of the present invention.
Figure 5:
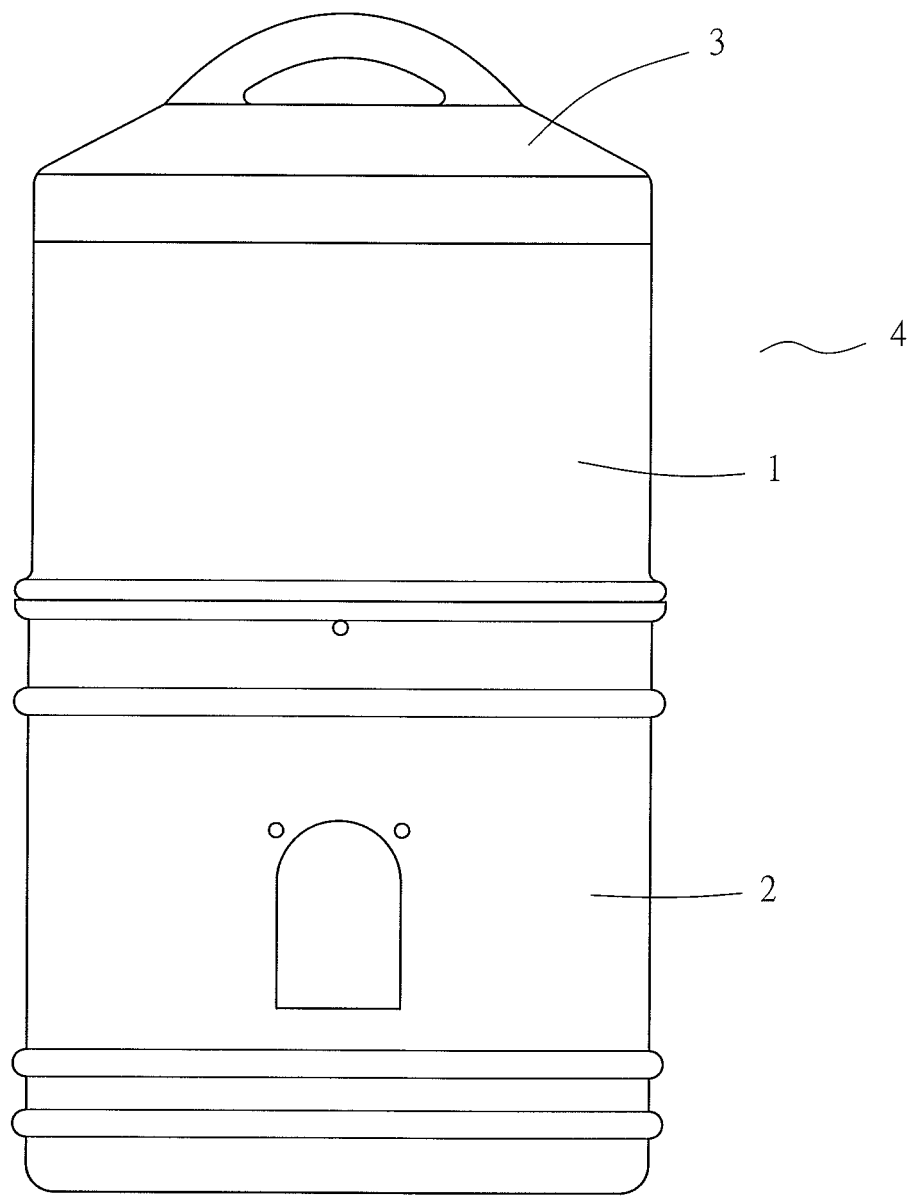
FIG. 5 is a front schematic of the assembled water container of the present invention.

The water container structure of present invention shown in FIG. 1 and FIG. 5 is the container combination 4 for an animal to drink water, and comprises a containing unit 1, for water to be added, at an upper end, a receiving unit 2 for the animal to drink the water with its mouth at a lower end, and a cover 3 covering an opening near an upside of the containing unit 1.

Figure 2:
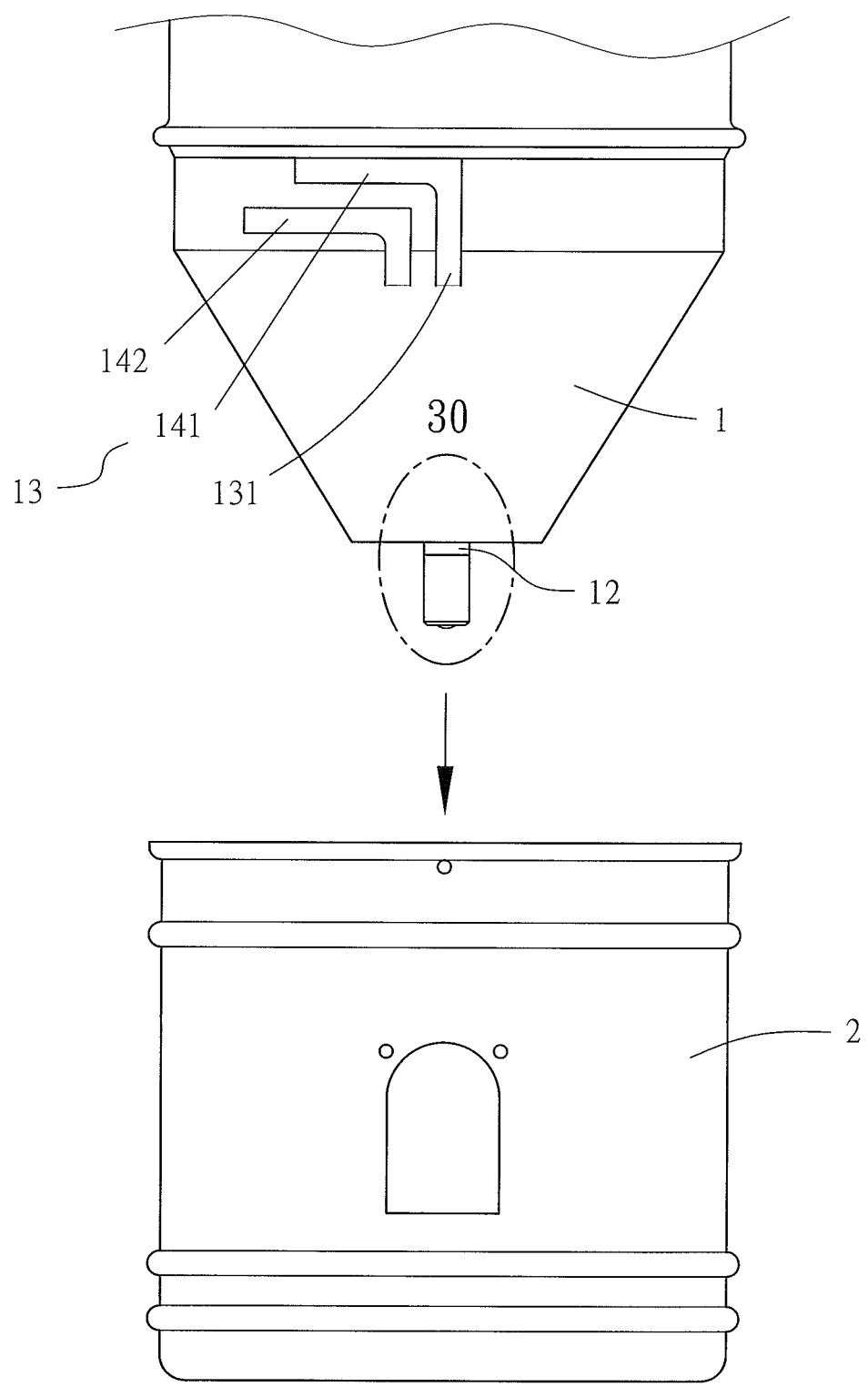
FIG. 2 is a schematic of assembling the water container of the present invention.
Figure 3:
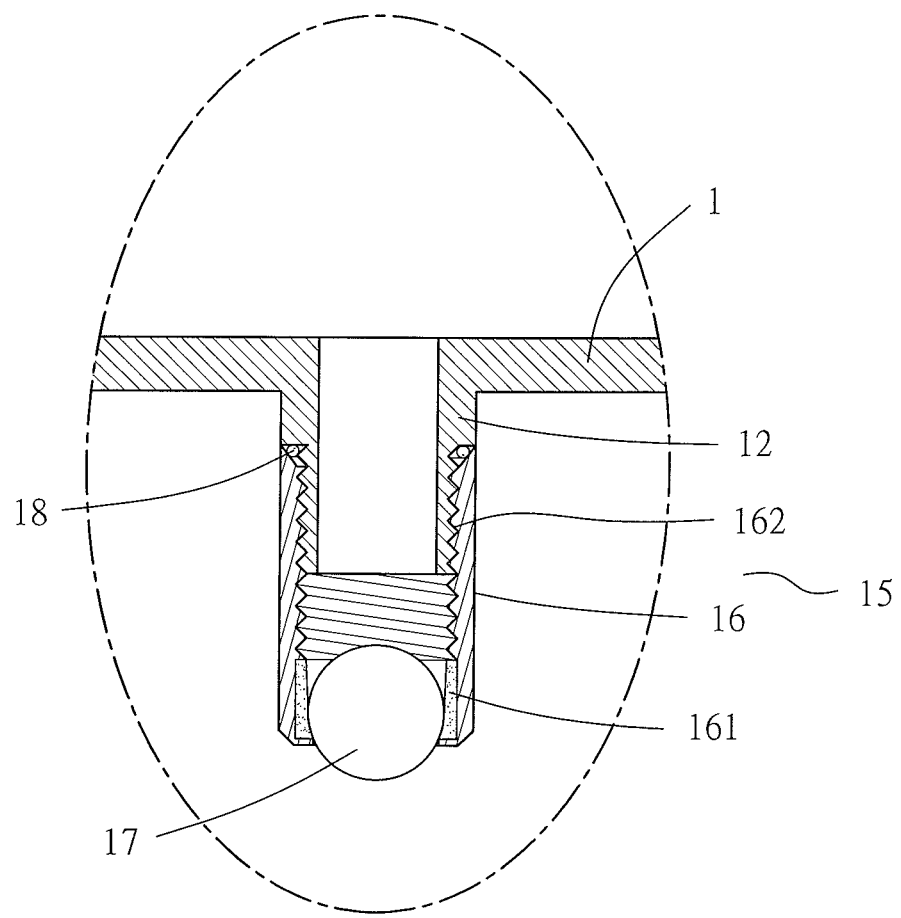
FIG. 3 is a partial cross-sectional detail drawing of 30 of FIG. 2.
Figure 4:
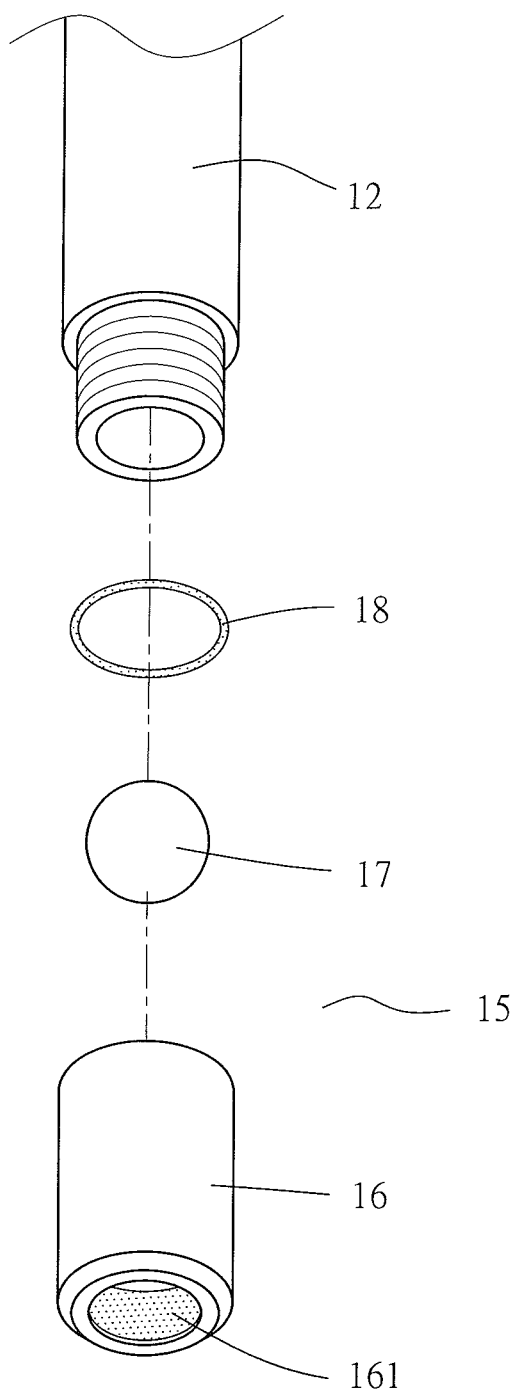
FIG. 4 is an exploded view of components of the water dispensing device of the present invention.

The containing unit 1 is a container for containing water, has a predetermined volume and a predetermined profile, and has an opening 11 at an upper end and an exit section 12 at a lower end. A plurality of grooves 13, spaced up and down, are concaved at two corresponding sides at a predetermined height of the containing unit 1. The implementation of the present invention is a first groove 141 and a second groove 142. A water dispensing device 15 is screwed at an exit section 12 at a downside of the containing unit 1 as shown in FIG. 2, FIG. 3, and FIG. 4. The water dispensing device 15 has a guiding tube 16 having a predetermined length. An end of the guiding tube 16 is covered with a stopping section 161, which is tilted inward at a lower end for putting a water stopping bead 17 inside and for forming a directional restriction at the stopping section 161. A screw section 162 is formed on an inner upper section of the guiding tube 16 for a ring 18 to enclose around the exit section 12 of the containing unit 1 during assembling, and the guiding tube 16, put the water stopping bead 17 therein, is screwed on the exit section 12 of the containing unit 1.

The receiving unit 2 is a receiving part, which determined the dispensing of water for an animal to drink according to an outside periphery of the containing unit 1. A pushing portion 22 is formed at the bottom of the receiving unit 2 and is slightly ridged. A plurality of through holes 21 are opened at a periphery of the receiving unit 2 as a space for the animal to drink water. Two projecting portions 22 extend inward at an upside of the receiving unit 2 at the lower end.

A cover 3, which is a covering part based on an opening 11 near an upside of the containing unit 1, provides a sealed state.

Figure 6:
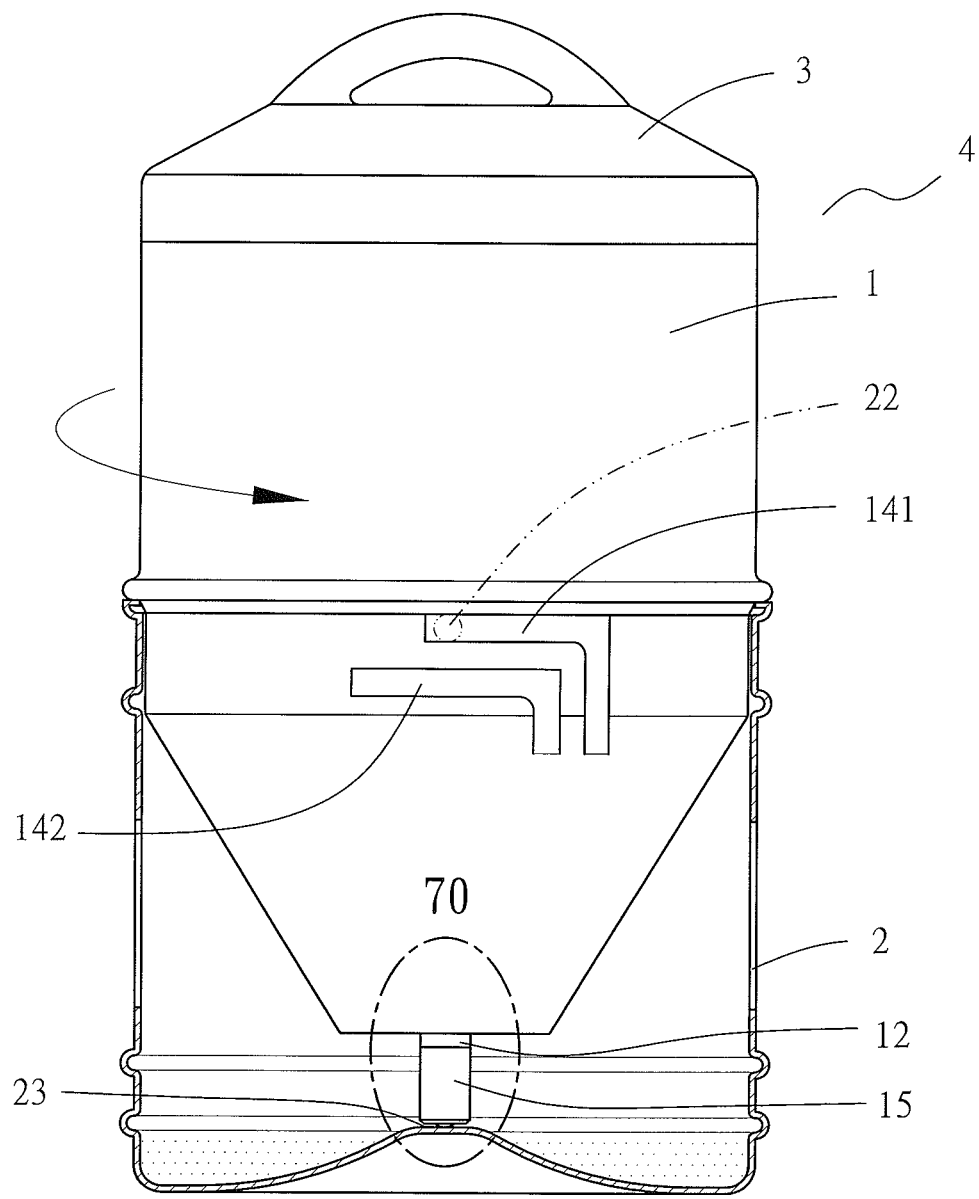
FIG. 6 is a partial cross-sectional schematic of the water container in a water dispensing state of the present invention.
Figure 7:
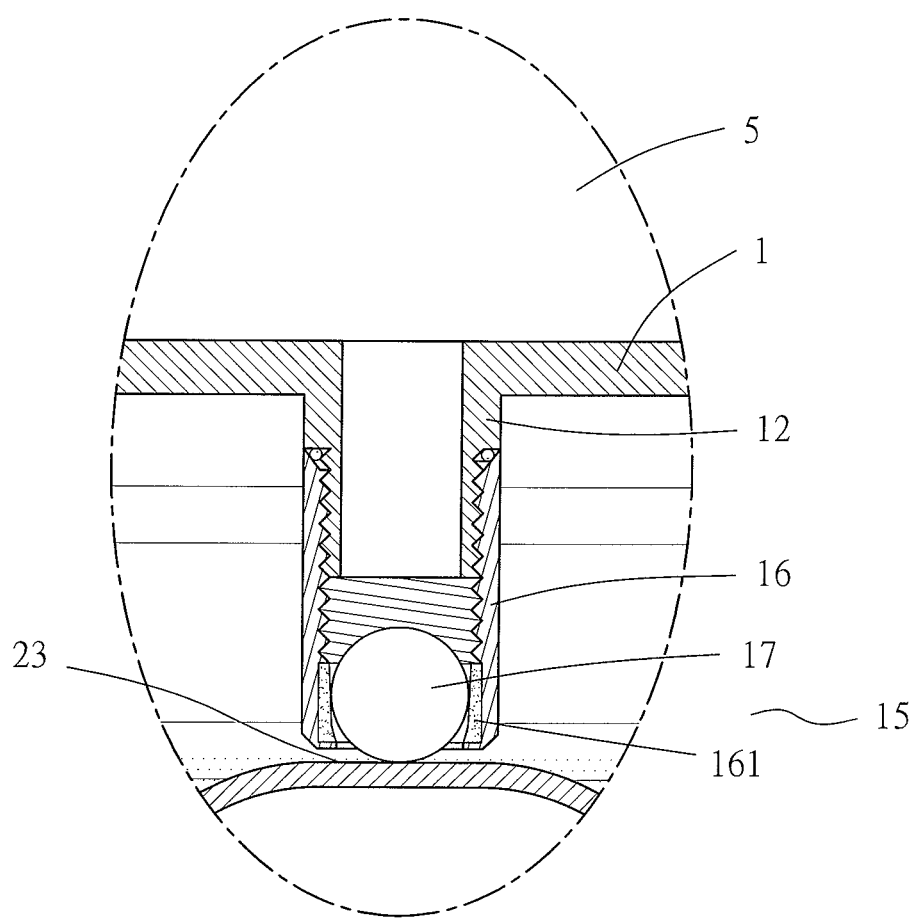
FIG. 7 is a partial cross-sectional detail drawing of 70 of FIG. 6.

When assembling the aforementioned containing unit 1, the receiving unit 2, and the cover 3 as shown in FIG. 2 and FIG. 6, an end (the implementation is an opening 131 opened downward) of the first groove 141 at an upside of the two sides of the containing unit 1 corresponds to the two projecting portions 22 at the upside of the receiving unit 2 at the lower end. The two projecting portions 22 insert in the first groove 141 of the containing unit 1 at the upper end. The water dispensing device 15 at the exit section 12 is combined with the containing unit 1 at the upper end and is pushed by the pushing portion 23 of the receiving unit 2 at the lower end. Thereby, the water stopping bead 17 in the water dispensing device 15 is pushed up inside the water dispensing device 15 to go into a water dispensing state as shown in FIG. 7. When the water dispensing amount reaches the stopping section 161 of the guiding tube 16, the water dispensing device 15 stops dispensing water. In the meantime, the cover 3 and the receiving unit 1 are sealed as shown in FIG. 7.

In the implementation of dispensing water of the aforementioned container combination 4 for animals to drink as shown in FIG. 6 and FIG. 7, the first groove 141 at the upside of the containing unit 1 at the upper end guides and is inserted with the two projecting portions 22 of the receiving unit 2 at the lower end by hand. Therefore, the containing unit 1 is installed at a lower part of the receiving unit 2 at the lower end, and the water dispensing device 15 at the exit section of the containing unit 1 is against the pushing part 23 of the receiving unit 2 to force the water stopping bead 17 in the water dispensing device 15 to move upward. Thereby, the water 5 in the containing unit 1 can enter the receiving unit 2 at the lower end through the exit section 12 and the water dispensing device 15 for animals to drink.

Figure 8:
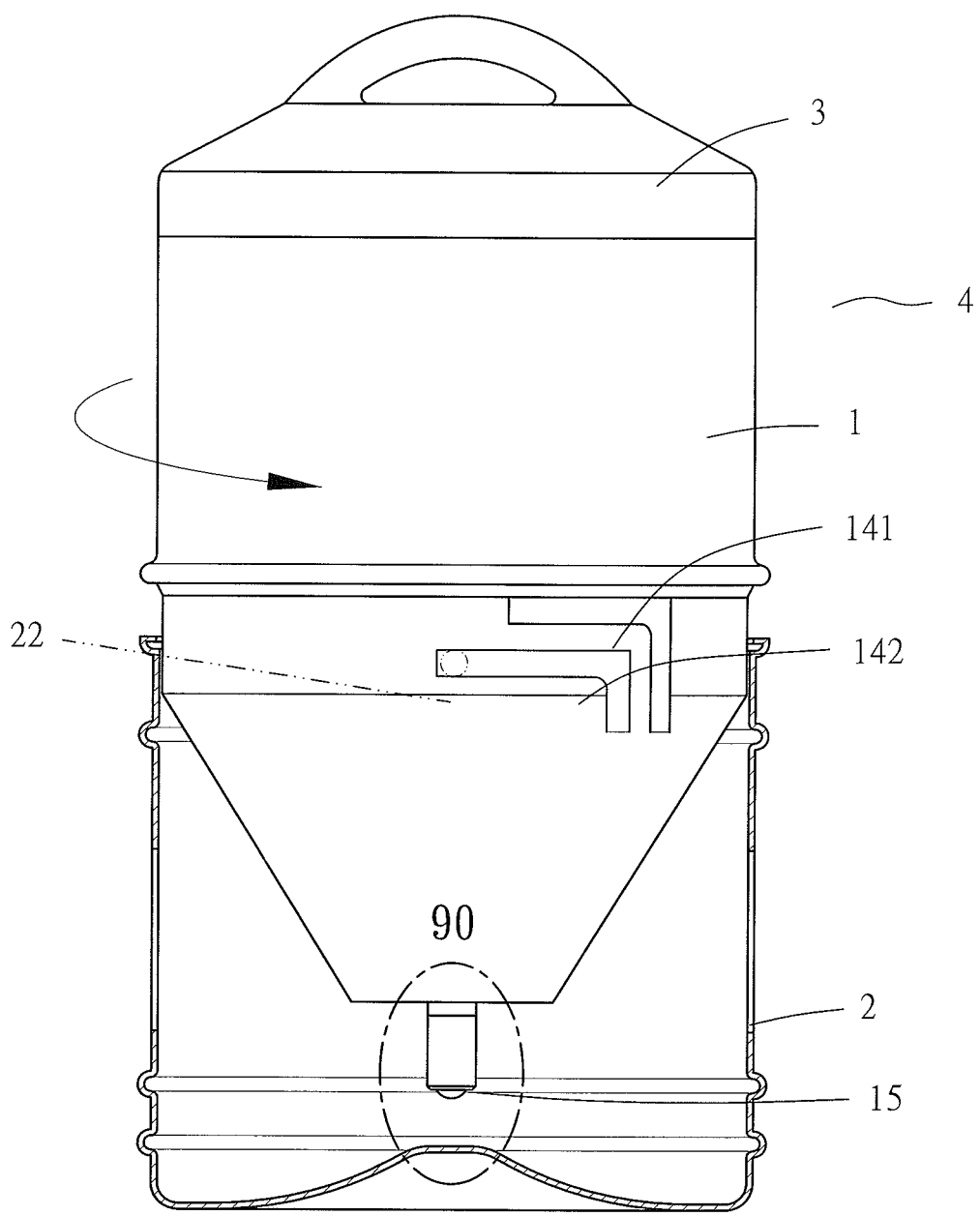
FIG. 8 is a partial cross-sectional schematic of the water container in a water stopping state of the present invention.
Figure 9:
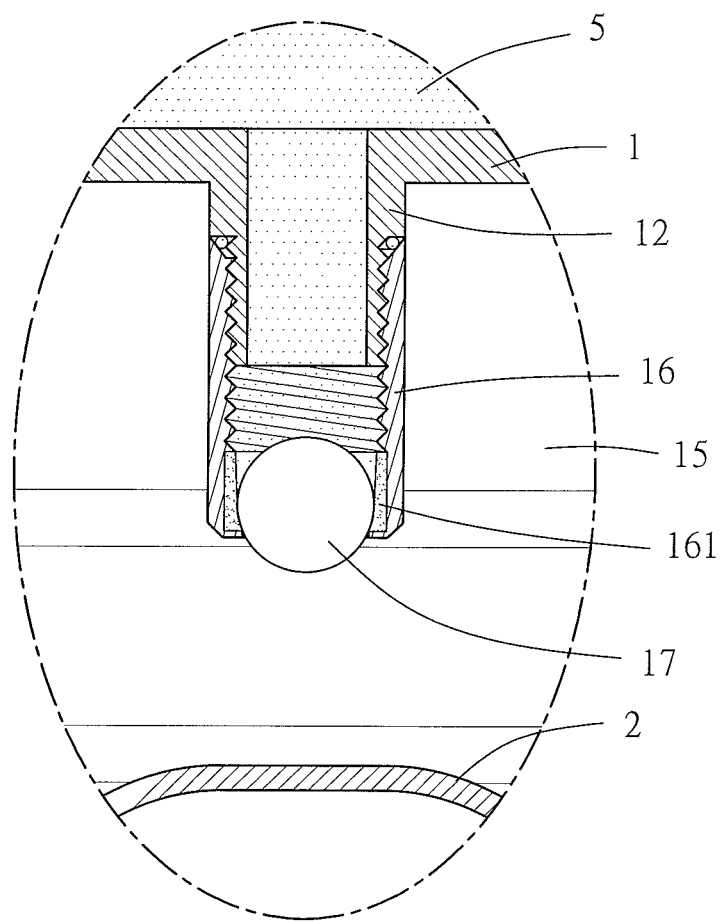
FIG. 9 is a partial cross-sectional detail drawing of 90 of FIG. 8.

In the implementation of stopping water of the container combination 4 as shown in FIG. 8 and FIG. 9, the first groove 141 at the upside of the containing unit 1 at the upper end is switched to the second groove 142 at the downside of the containing unit 1 at the upper end for guiding and being inserted with two projecting portions 22 of the receiving unit 2 at the lower end by hand. Therefore, the containing unit 1 is installed at an upper part of the receiving unit 2 at the lower end, and the water dispensing device 15 at the exit section 12 of the containing unit 1 is spaced part from the pushing part 23 of the receiving unit 2 with a distance. Thereby, the water stopping bead 17 of the water dispensing device 15 freely falls against the stopping section 161 of the guiding tube 16 to go to a water stopping state of stopping the water 5 in the containing unit 1 from falling.

What is claimed is:

1. A water container structure, wherein the water container structure is a container combination for an animal to drink water, the water container structure comprises a cover for sealing and a containing unit, for water to be added, at an upper end and a receiving unit for the animal to drink the water with its mouth at a lower end, the improvement comprises: the containing unit at the upper end combines with the receiving unit at the lower end, a plurality of grooves, spaced up and down, are concaved at two corresponding sides at a predetermined height of the containing unit at the upper end for two projecting portions extending inward at an upside of the receiving unit at the lower end to insert in, a water dispensing device is screwed at an exit section at a downside of the containing unit, the water dispensing device has a guiding tube having a predetermined length, an end of the guiding tube is covered with a stopping section, which is tilted inward at a lower end for putting a water stopping bead inside and for forming a directional restriction at the stopping section, a screw section is formed on an inner upper section of the guiding tube for a ring to enclose around the exit section of the containing unit during assembling, and the guiding tube, put the water stopping bead therein, is screwed on the exit section of the containing unit; the water stopping bead in the water dispensing device is pushed up by a pushing portion of the receiving unit at the lower end in a water dispensing state, when the water stopping bead of the water dispensing device freely falls against the stopping section of the guiding tube in a water stopping state, and a water dispensing amount of the container combination is controlled by installing the containing unit at the upper end on the receiving unit at the lower end by hand to screw the water dispensing device of the containing unit at the upper end with the receiving unit at the lower end to allow to predetermined control of the water dispensing amount.

2. The water container structure in claim 1, wherein the pushing portion of the receiving unit at the lower end of the container combination is slightly ridged.

3. The water container structure in claim 1, wherein an opening near an upside of the containing unit at the upper end of the container combination is directionally covered or directionally screwed with the cover.

* * * * *